United States Patent [19]
Ernst

[11] Patent Number: 5,828,822
[45] Date of Patent: Oct. 27, 1998

[54] WATCHDOG CIRCUIT FOR CARBON MONOXIDE MONITORS

[75] Inventor: Stephen M. Ernst, Colorado Springs, Colo.

[73] Assignee: Nighthawk Systems, Inc., Colorado Springs, Colo.

[21] Appl. No.: 426,723

[22] Filed: Apr. 21, 1995

[51] Int. Cl.$^6$ .................................................. G01R 31/28
[52] U.S. Cl. ................................ 395/182.21; 395/185.01
[58] Field of Search ........................ 395/185.08, 185.09, 395/183.21, 182.21, 185.1, 185.01, 183.01, 183.1, 183.15, 184.01; 371/57.1, 47.1; 324/525, 526; 73/1.03; 364/550

[56] References Cited

U.S. PATENT DOCUMENTS 4,251,883  2/1981  Grants et al. .......................... 395/185.1
4,514,845  4/1985  Starr ..................................... 395/183.19
4,965,800  10/1990 Farnbach ................................. 371/22.1

OTHER PUBLICATIONS

Microchip Data Book, Chapter 2 PIC16C5X Series, Sections 1–5, Microchip Technologies, Inc. (1993).

Primary Examiner—Robert W. Beausoliel, Jr.
Assistant Examiner—Nadeem Iqbal
Attorney, Agent, or Firm—Darby & Darby

[57] ABSTRACT

A microcontroller supervision circuit comprising an electronic control capable of causing a high-impedance on at least one external pin upon occurrence of a reset condition. A supervision circuit is coupled to the at least one external pin for detecting the high-impedance condition. Upon detection of the high-impedance condition, a signal is generated to indicate failure of the microcontroller to execute code. The microcontroller is programmed to remove the high-impedance condition when code is properly executed within the microcontroller.

7 Claims, 5 Drawing Sheets

WATCHDOG CIRCUIT FOR CARBON MONOXIDE MONITORS

BACKGROUND OF THE INVENTION

1. Field of the Invention.

The present invention relates, in general, to carbon monoxide monitors, and, more particularly, to a watchdog circuit for supervision of a microcontroller or microprocessor in a carbon monoxide monitor.

2. Statement of the Problem.

Carbon monoxide monitors have traditionally been used only in industrial environments. Because of this, they were low volume, relatively expensive products. Also, because they were not mass-marketed in the consumer marketplace, they did not have to comply with various government and private industry standards that apply to consumer goods. An important example of such private certification is that issued by Underwriters Laboratories (UL).

Unlike common smoke detectors, burglar alarms, and even simple carbon monoxide detectors, a carbon monoxide monitor senses and reports the value of carbon monoxide concentration rather than merely triggering an alarm once a hazard condition exists. Thus, the carbon monoxide monitor is more akin to a measurement device that the common smoke detector or burglar alarm. While carbon monoxide monitors provide increased reliability and usability to the customer, they require complex logic devices including microprocessors or microcontrollers, to operate.

In order to successfully compete in the consumer marketplace, carbon monoxide detectors must comply with various private certifications standards that are commonplace for consumer electronics. UL categorizes electronic components according to their inherent reliability. Components employed in applications that require high reliability, such as carbon monoxide detectors, must meet stringent long term reliability and operability standards. As a general rule, as circuits become more complex, it becomes more difficult to meet these reliability and operability standards. For this reason, alarm manufacturers tend not to use general purpose integrated circuits such as programmable microcontrollers and microprocessors.

Carbon monoxide involves several problems that require computational ability in the carbon monoxide monitor. People are endangered by short term exposure to high concentrations of CO, which often can be detected with simple circuitry. However, people are also endangered by long term exposure to lower levels of CO. Computational ability is required to integrate the carbon monoxide exposure over time to effectively warn of long term exposure hazards. Also, background concentration of 5–10 parts per million (PPM) are not uncommon, which can cause false alarms unless the monitor includes some computational ability to subtract out the background concentration. Further, carbon monoxide sensors themselves often require periodic heating and temperature control to operate well. Hence, it is desirable that manufacturers be able to incorporate general purpose microcontrollers and microprocessors into carbon monoxide monitors while satisfying high reliability requirements.

Microprocessors and microcontrollers are widely used in a variety of consumer applications. However, very few consumer applications are intended to protect the consumer from life-threatening conditions, hence very few microcontroller applications are required to meet stringent reliability criteria. In this aspect, carbon monoxide monitors are unique from other microcontroller applications.

The term microcontroller as used herein includes microcontrollers, microprocessors, and the like. Microcontrollers are highly integrated devices that execute a stored program. The program is stored as a series of instructions, usually in non-volatile memory. Microcontrollers often use external resonators to supply a clock pulses that paces the microcontroller. Instructions may take one, two, or more clock cycles to be executed depending on the design of the microcontroller. If the resonator fails, the microprocessor will not execute instructions.

Microcontrollers can experience a variety of problems due to noise or internal component failure or aging. Microcontrollers often include circuitry for detecting these problems and resetting the microprocessor to a known state so that it can continue to execute its programmed routine. These circuits are internal to the microprocessor and are called "watchdog" circuits. Watchdog circuits typically use an internal watchdog timer that operates independently of the resonator circuit. The watchdog circuit will trigger, thus resetting the microcontroller, after a predetermined time. This predetermined time may be, for example, 10–200 milliseconds (mS).

During normal operation, the coded instructions include instructions to clear the watchdog timer to prevent it from triggering. Hence, so long as the microcontroller is executing the code and the code includes instructions to clear the watchdog timer before the predetermined time limit, the watchdog circuit will not trigger.

Watchdog circuits can handle many types of errors. However, some errors can prevent the microprocessor from executing code. For example, if the resonator fails, code will not be executed. In other cases, the microcontroller may fall into an endless loop which does not include an instruction to clear the watchdog timer. In these cases, the watchdog circuit will force the microcontroller to reset while the components that rely on instructions from the microcontroller become inactive. In the case of a carbon monoxide detector, the external circuitry may report that no alarm condition exists when in fact a high concentration of CO is detected, but unreported by the microcontroller. Alternatively, the sensor may be improperly driven so that the readings are inaccurate.

In either of these cases, the watchdog circuit effectively resets the microprocessor, but fails to generate any external indication that the reset has occurred or that the microprocessor has failed to execute code. An unwary user may believe that the circuit is operating properly even though it is locked in a reset condition that prevents any alarm from sounding. Hence there is a need for circuits that can detect and signal when a failure internal to a microprocessor has occurred.

3. Solution to the Problem.

The above-identified problems are solved by a microcontroller supervision circuit that operates external to the microcontroller. The microcontroller is selected to be a type that produces a high-impedance condition on at least one output pin when a reset occurs within the microcontroller. The microcontroller supervision circuit detects this high-impedance condition and signals an alarm. When the microcontroller executes code properly, the microcode is programmed to remove the high-impedance condition and therefore disable the alarm. Hence, whenever the microcontroller resets due to a low power condition, failure of the resonator, or other cause that triggers the internal watchdog circuit, the external circuit with which the microcontroller must cooperate can recognize the internal failure and sound an alarm or take appropriate action.

SUMMARY OF THE INVENTION

Briefly stated, the present invention involves a microcontroller supervision circuit comprising an electronic control that is capable of causing a high-impedance upon occurrence of a reset condition. A supervision circuit is coupled to the at least one external pin for detecting the high-impedance condition. Upon detection of the high-impedance condition, a signal is generated to indicate failure of the microcontroller to execute code. The microcontroller is programmed to remove the high-impedance condition when code is properly executed within the microcontroller.

DETAILED DESCRIPTION OF THE DRAWING

1. Overview.

Figure 1:
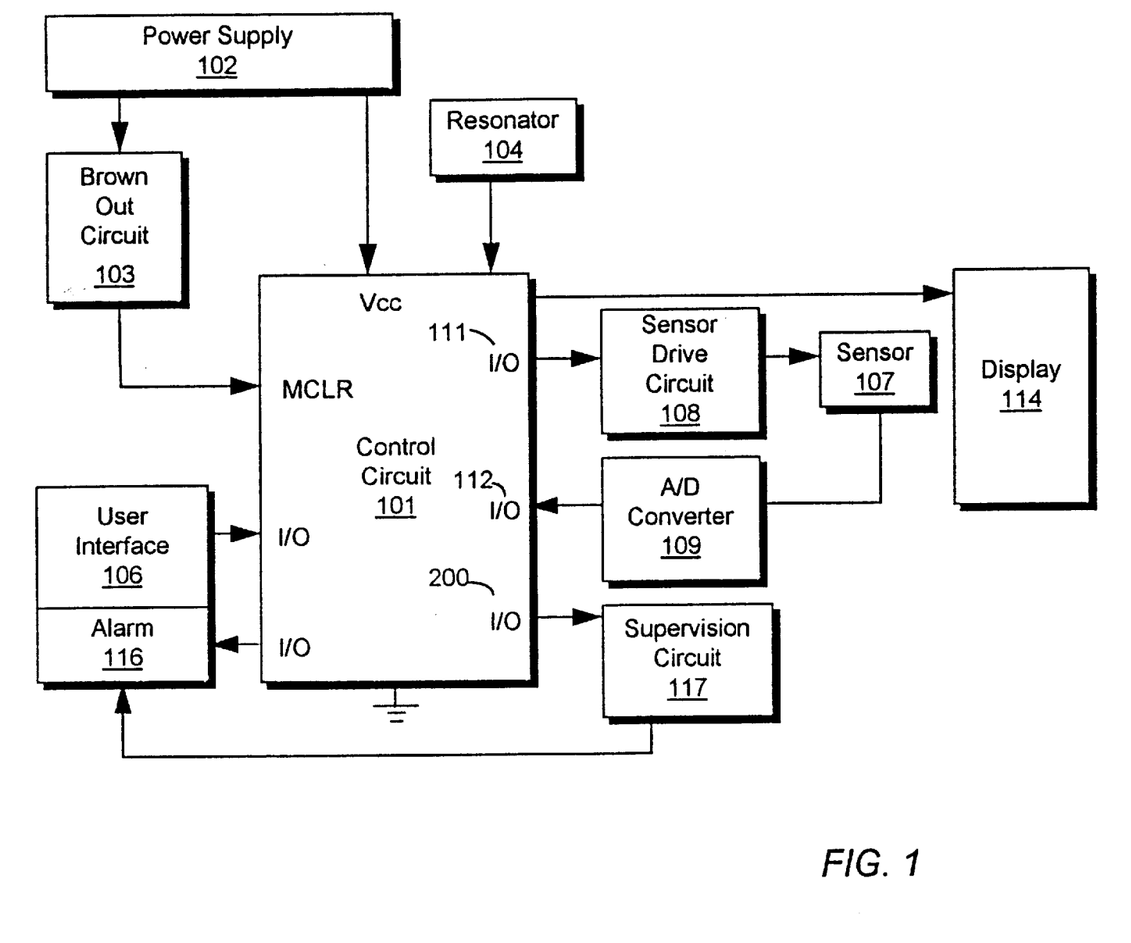
FIG. 1 illustrates in block diagram form a carbon monoxide sensor including a microcontroller supervision circuit in accordance with the present invention.

The present invention is described in terms of a carbon monoxide monitor, as shown in FIG. 1. The carbon monoxide monitor shown in FIG. 1 is only an example of a circuit that can use a microcontroller supervision circuit in accordance with the present invention. Any circuit employing a microcontroller in which high reliability must be ensured by supervision of the microcontroller can make use of the teachings of the present invention.

Control circuit 101 is a general purpose programmable microcontroller in the preferred embodiment. Any brand, size, or complexity of microcontroller or microprocessor may be used in accordance with the present invention. Likewise, control circuit 101 may be implemented using several discrete integrated circuits to perform the processing, memory, and data transfer operations that are normally integrated into a microcontroller. Control circuit 101 typically includes a plurality of registers for temporarily storing data, a program memory for storing microcode instructions, and an arithmetic/logic unit (ALU) to perform arithmetic and Boolean functions between data held in the registers. Various designs for control circuits including microcontrollers and microprocessors are well known, and any can be used in accordance with the teachings of the present invention.

Control circuit 101 is powered by power supply 102 that supplies an appropriate DC voltage to control circuit 101. Optional brown out circuit 103 prevents operation of control circuit 101 until the power supply voltage provided by power supply 102 is at a predetermined minimum condition. Brown out circuit 103 provides a signal to master clear (MCLR) as shown in FIG. 1. The master clear signal resets control circuit 101 when it is asserted. Control circuit 101 also requires an external resonator 104 that serves to provide an oscillating signal upon which the control circuit 101 clock is based. A variety of oscillator circuits are well known for resonator 104.

If either brown out circuit 103 or resonator 104 fail to operate properly, control circuit 101 will fail to execute code properly. In the case of brown out circuit 103, assertion of a signal on the master clear line will hold control circuit 101 in a reset condition. Similarly, failure of resonator 104 will cause an internal watchdog circuit within control circuit 101 to time out, forcing control circuit 101 into a reset condition. It is a purpose of the present invention to provide an apparatus and method for detecting failures either internal to control circuit 101 or caused by external component such as brown out circuit 103 and resonator 104 that cause control circuit 101 to reset and fail to execute code after the reset.

In the specific implementation shown in FIG. 1 as a carbon monoxide monitor, user interface 106 provides a means for accessing control circuit 101. User interface 106 may be as simple as a single switch used to test or reset control circuit 101 manually. User interface 106 may be more complex depending on the needs of a particular application.

Sensor 107 in accordance with the preferred embodiment is a carbon monoxide sensor. Sensor 107 is an electrical element having some electrical property that changes in response to changes in an environmental condition. In the case of a carbon monoxide sensor, sensor 107 comprises a chemical cell in which resistance changes roughly proportionally with concentration of carbon monoxide to which sensor 107 is exposed. Sensor 107 may also indicate a change by a change in capacitance, a change in leakage current, or a change in gain depending on the particular type of sensor used.

In order to measure the value of sensor 107, a stimulus current must usually be supplied and a response current or voltage must be measured. Sensor drive circuit 108 provides an appropriate drive current or voltage to sensor 107. A/D converter circuit 109 measures the response current or voltage from sensor 107. Sensor drive circuit 108 is also responsible for conditioning sensor 107. In the case of carbon monoxide sensors, it is often necessary to carefully heat sensor 107 for a predetermined time to ensure accurate readings. Sensor drive circuit 108 provides the necessary heating currents and feedback required to control sensor 107. Sensor drive circuit 108 is activated at predetermined times through I/O port 111 that may comprise one or more data input/output terminals from control circuit 101. Likewise, A/D converter circuit 109 provides a digital input through I/O port 112.

It should be understood that a great variety of configurations and components to implement the functions of sensor drive circuit 108, sensor 107, and A/D converter 109 are known and are equally applicable in accordance with the present invention. The embodiment of applicant's invention in a carbon monoxide sensor is merely an example of a system requiring high-reliability microprocessor supervision.

Control circuit 101 processes the data received from A/D converter 109 using the instructions stored in program memory. So long as the program memory is properly executing code, the inputs from A/D converter 109 are processed and displayed on display 114. Control circuit 101 also computes when a hazardous condition exists based upon the properly processed data received from A/D converter 109.

When the hazardous condition exists, control circuit 101 signals an alarm condition to alarm 116.

It is readily apparent that control circuit 101 and proper execution of code within control circuit 101 is vital to operation of a carbon monoxide monitor or similar high reliability circuit. Should code fail to execute, sensor drive circuit 108 will fail to provide accurate currents to sensor 107 or perhaps fail to provide a proper heating cycle for sensor 107. Similarly, A/D converter circuit 109 may be improperly driven resulting in erroneous readings. If code fails to execute, the inputs from A/D converter 109 are improperly processed resulting in erroneous readings. Erroneous readings cause either false alarm conditions or failure to alarm when a hazardous condition exists.

Figure 3:
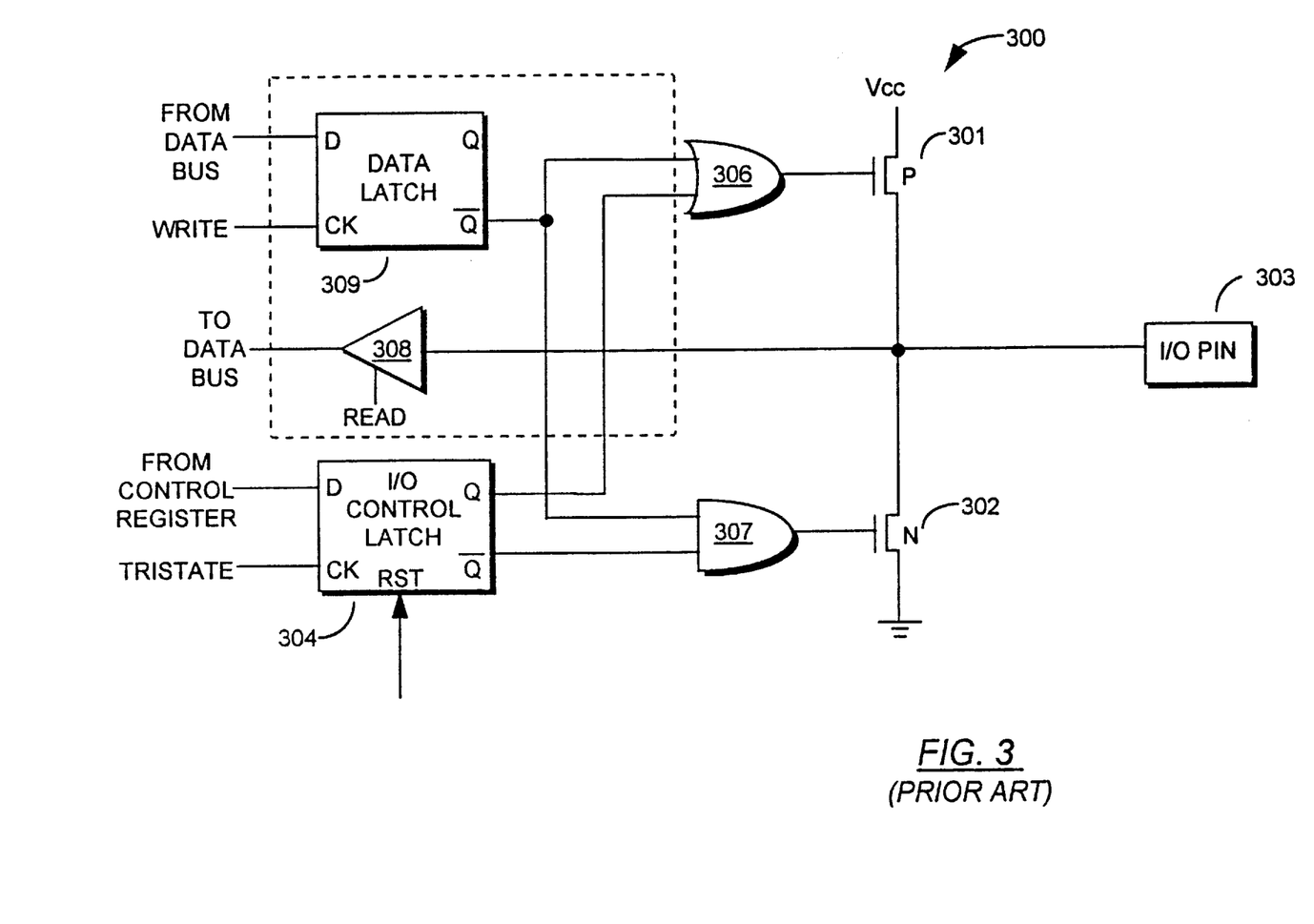
FIG. 3 illustrates a prior art example of a input/output pin that is configured to function in accordance with the apparatus and method of the present invention.

In accordance with the present invention, supervision circuit 117 is coupled to I/O port 200. Typically, supervision circuit 117 can operate off a single data I/O pin of a microcontroller circuit (As shown in FIG. 3). Supervision circuit 117 detects when control circuit 101 has failed to execute code, and provides a signal directly to alarm 116. The signal produced by supervision circuit 117 may also be used for other purposes such as to activate or enable a backup microprocessor or to alert a remote monitor the failure of control circuit 101. Supervision circuit 117 thus allows the external circuit or the user to take action and response to a failure of control circuit 101.

It should be understood that the particular embodiment shown in FIG. 1 is a preferred example of a control circuit used in a high-risk environment. Control circuit 101 and supervision circuit 117 may also be embodied in other circuits using a microcontroller in a high-reliability environment. For example, automotive engine controllers could make use of supervision circuit 117 to signal an internal failure of control circuit 101. It should be understood that sensor drive circuit 108, A/D converter 109, and sensor 107 may or may not be required in a particular application. Likewise, display 114 and alarm 116 are designed to meet the needs of a particular application and may not be necessary. Timer 104 may be an external resonator, or may be integrated within control circuit 101. Control circuit 101 may be provided as a single integrated circuit, or as a plurality of integrated circuits coupled together to provide the functionality of a microcontroller. These and other equivalent embodiments that are within the scope and sprit of the present invention.

2. Microcontroller I/O Pin Design.

Figure 2:
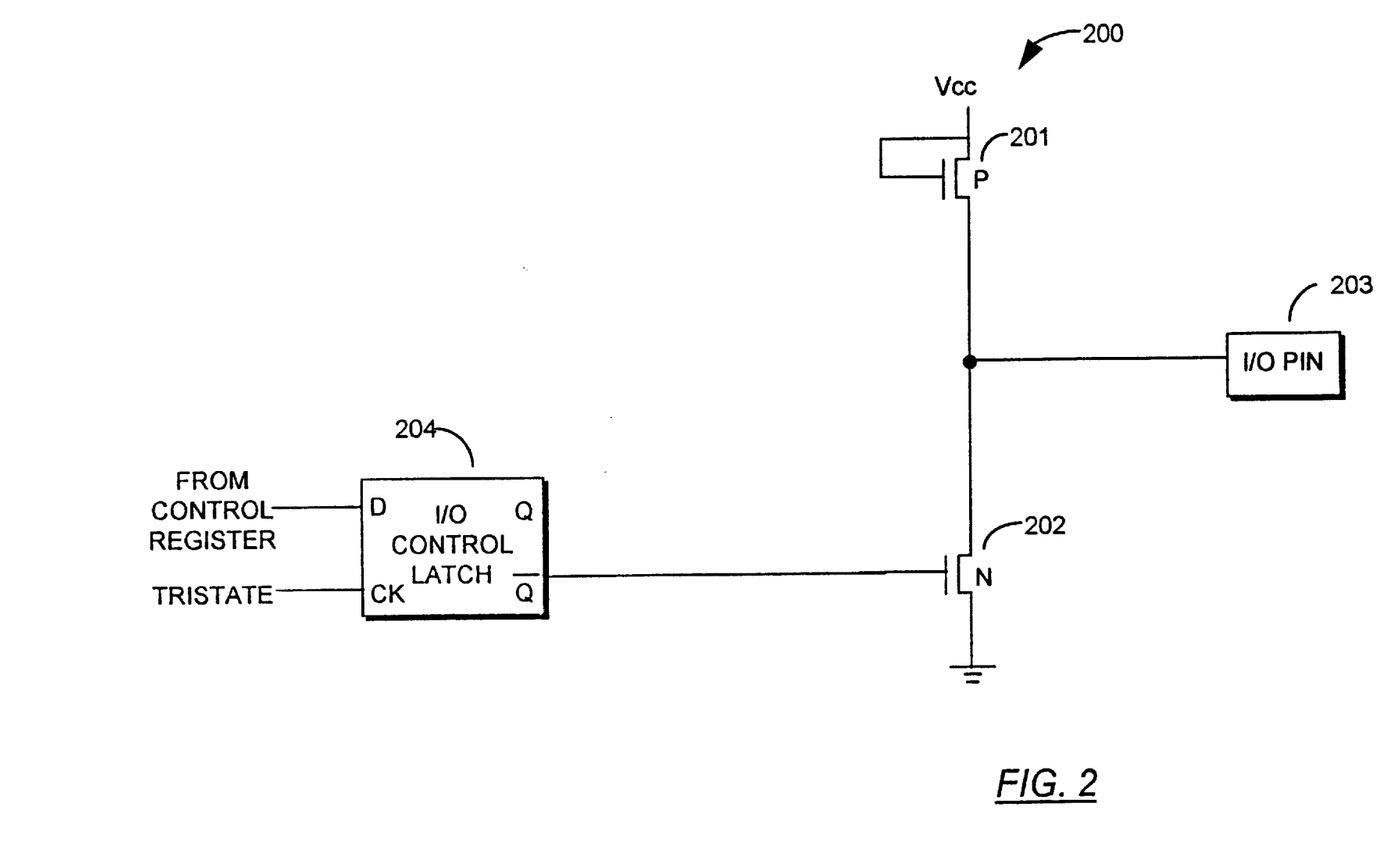
FIG. 2 shows in schematic form a first embodiment input/output pin design for a supervision circuit shown in FIG. 1.

FIG. 2 and FIG. 3 illustrate alternative circuits implemented internal to control circuit 101 to implement I/O port 200 shown in FIG. 1. FIG. 2 illustrates a basic approach that may require modification of the integrated circuit structure itself while FIG. 3 illustrates implementation of I/O port 200 using a conventional prior art circuit design. As shown in FIG. 2, I/O pin 203 is coupled to a positive voltage supply through a P-channel transistor 201. I/O pin 203 is coupled to ground or a negative voltage supply through N-channel transistor 202.

A gate of P-channel transistor 201 is coupled to a Q output of I/O control latch 204. A gate of N-channel transistor 202 is coupled to a $\overline{Q}$ output of I/O control latch 204. Using the polarities shown in FIG. 2, a logic 1 on the Q output at the same time as a logic zero on the $\overline{Q}$ output of I/O control latch 204 results in both transistors 201 and 202 being non-conductive. In this state, I/O pin 203 is in a high impedance state.

Hence, when the input from the control register to the D input of I/O control latch 204 is a logic high and the clock input is activated by a tri-state pulse, the $\overline{Q}$ output will be driven low creating the high impedance condition. In many designs, the tri-state pulse is a synchronous pulse that is gated to the system clock by additional circuitry (not shown). This may prevent the tri-state signal from being asserted if the system clock fails.

I/O control latch 204 is preferably provided with an asynchronous reset input labeled RST in FIG. 2. A signal asserted on the synchronous input of I/O control latch 204 causes the Q output to go to a logic high and the $\overline{Q}$ output will be driven low creating the high impedance condition. By coupling the system reset signal to the RST input of I/O control latch 204, I/O pin 203 will be placed in the high impedance state even if the system clock has failed.

By changing the contents of the control register to a logic zero and implementing another tri-state command, the $\overline{Q}$ output is changed to a logic high thereby turning on N-channel resistor 202. When N-channel transistor 202 is activated, I/O pin 203 is driven to a logic low which is a low impedance condition. The input from the control register applied to the D input of I/O control latch 204 and at the tri-state input are controlled by execution of the microcode in control circuit 101. Control circuit 101 is programmed to initialize I/O control latch 204 in a high impedance condition upon occurrence of a reset internal to control circuit 101. In this manner, microcode in control circuit 101 can be programmed to change I/O control latch 204 from a high impedance to a low impedance condition when code is properly executed in control circuit 101. If code fails to execute in control circuit 101, I/O control latch 204 will remain in a high impedance state thus forcing I/O pin 203 to the high impedance state that can be detected external to control circuit 101.

It is to be understood that the circuit shown in FIG. 2 can be implemented in a variety of ways with different types of flip-flops for I/O control latch 204 and opposite polarity transistors for transistors 202 and 201. Likewise, transistors 201 and 202 can be implemented as bipolar transistors as is well known in the semiconductor art. The low impedance condition can be realized by applying a logic zero to the gate of P-channel transistor 201 while maintaining N-channel transistor 202 in an off condition. It is to be expressly understood that these and other implementations of the circuit shown in FIG. 2 are considered equivalent to the specific embodiment illustrated.

One difficulty with the circuit shown in FIG. 2 is that is requires modification of the internal circuitry of control circuit 101. It is an intent of the present invention to provide microcontroller supervision using off-the-shelf general purpose microcontrollers that are widely available. As shown in FIG. 3, the circuit of FIG. 2 can be implemented in a conventional microcontroller I/O circuit. I/O circuit 300 is a conventional tri-state data I/O that is typically provided on all I/O pins of a microcontroller. Circuit 300 conventionally serves to program I/O pin 303 as either an input or an output under control of the microcode executed in control circuit 101.

I/O pin 303 is coupled to P-channel transistor 301 and N-channel transistor 302 to the positive and ground power supplies respectively. The gate of P-channel transistor to 301 is coupled to the output of OR gate 306. OR gate 306 receives as inputs the Q output from I/O control latch 304 and the $\overline{Q}$ output from data latch 309.

The gate of N-channel transistor 302 is coupled to the output of AND gate 307. AND gate 307 receives as inputs the $\overline{Q}$ output from data latch 304 and the $\overline{Q}$ output from I/O control latch 304. Read buffer 308 transfers the contents of I/O pin 301 to the data bus on control circuit 101 shown in FIG. 1.

In operation, I/O circuit 300 is programmed as an input by supplying a zero from the control register to the D input of I/O control latch 304. Upon application of the tri-state signal to the clock of I/O control latch 304 a logic high is applied to one input of OR gate 306 and a logic low is applied to one input of AND gate 307. This will ensure that the output of OR gate 306 is a logic high thereby turning off P-channel transistor 301. This will also ensure that the output of AND gate 307 is a logic low thereby turning off N-channel transistor 302 and placing I/O pin 303 in a high impedance state.

By placing a logic zero on the control register input to the D input of I/O control latch 304 and opposite condition results. A logic zero is applied to the input of OR gate 306 and a logic one is applied to the AND gate of input 307. In this mode the output of OR gate 306 and AND gate 307 depend on the state of the $\overline{Q}$ output of data latch 309. When the $\overline{Q}$ output is a logic zero the output of OR gate 306 is a logic zero turning on P-channel transistor 301 and resulting in a logic high on I/O pin 303. In this condition the output of AND gate 307 is a logic low turning off N-channel transistor 302. When the $\overline{Q}$ output of data latch 309 is a logic high, the output of OR gate 306 is a logic high turning off P-channel transistor 301 and the output of AND gate 307 is a logic high turning on N-channel transistor 302. This condition results in a logic low on I/O pin 303. Hence, a logic zero on the D input of I/O control latch 304 places I/O circuit 300 in an output mode such that I/O pin 303 can drive a logic one or logic zero depending on the state of data latch 309.

I/O circuit 300 is a conventional circuit used as a configurable I/O block in many microcontrollers. A requirement of the present invention is that I/O circuit 300 be programmed or configured such that whenever a reset occurs in control circuit 101 a reset signal is asserted on the reset input of I/O control latch 304. The reset input, indicated by RST in FIG. 3, is an asynchronous input meaning that it will cause I/O control latch 304 to go into a reset state whether or not the system clock is operational. In the embodiment shown in FIG. 3, the reset state of I/O control latch 304 places a logic 1 on the Q output and a logic 0 on the $\overline{Q}$ output. Hence, the reset state places I/O pin 303 at a high impedance state. This is a common configuration in commercially available microcontrollers.

I/O pin 303 will remain in the high impedance state until I/O control latch 304 is toggled. A logic zero can be applied to the D input of I/O control latch 304 if a proper instruction is coded and executed by control circuit 101 to place a logic zero on the D input of I/O control latch 304. Moreover, a logic 0 appearing on the D input will only toggle the outputs of I/O control latch 304 if the system clock is operating. This is because the tri-state input to I/O control latch 304 is a clocked signal as set out hereinbefore. Hence, a failed system clock or a failure to execute the code required to toggle the state of I/O control latch 304 will result in a continued high impedance state on I/O pin 303.

It can be seen that the essential components of I/O control circuit 200 are easily implemented in the conventional I/O circuit 300 shown in FIG. 3. As shown in FIG. 3, the right control line to data latch 309 is simply coupled to ground to disable the functioning of data latch 309. A logic one on the $\overline{Q}$ output of data latch 309 causes the output of OR gate 306 to be a logic high constantly and causes the output of AND gate 307 to follow the state of the $\overline{Q}$ output of I/O control latch 304. Hence, I/O circuit 300 in FIG. 3 becomes the logical equivalent of I/O circuit 200 shown in FIG. 2.

It should be understood that data latch 309 can be disabled under the control of control circuit 101 through appropriate programming. It is important that data latch 309 initialize after a reset with a logic high on the $\overline{Q}$ output. Any means of maintaining data latch 309 in this state is acceptable including tying the right input to ground, or tying the data input D to ground. Read buffer 308 is not used in accordance with the present invention and so may or may not be implemented in I/O circuit 300. These modifications, as well as the modifications suggested in referenced to FIG. 3 are equivalent to the specific embodiment described.

3. Microcontroller Supervision Circuit.

Figure 4:
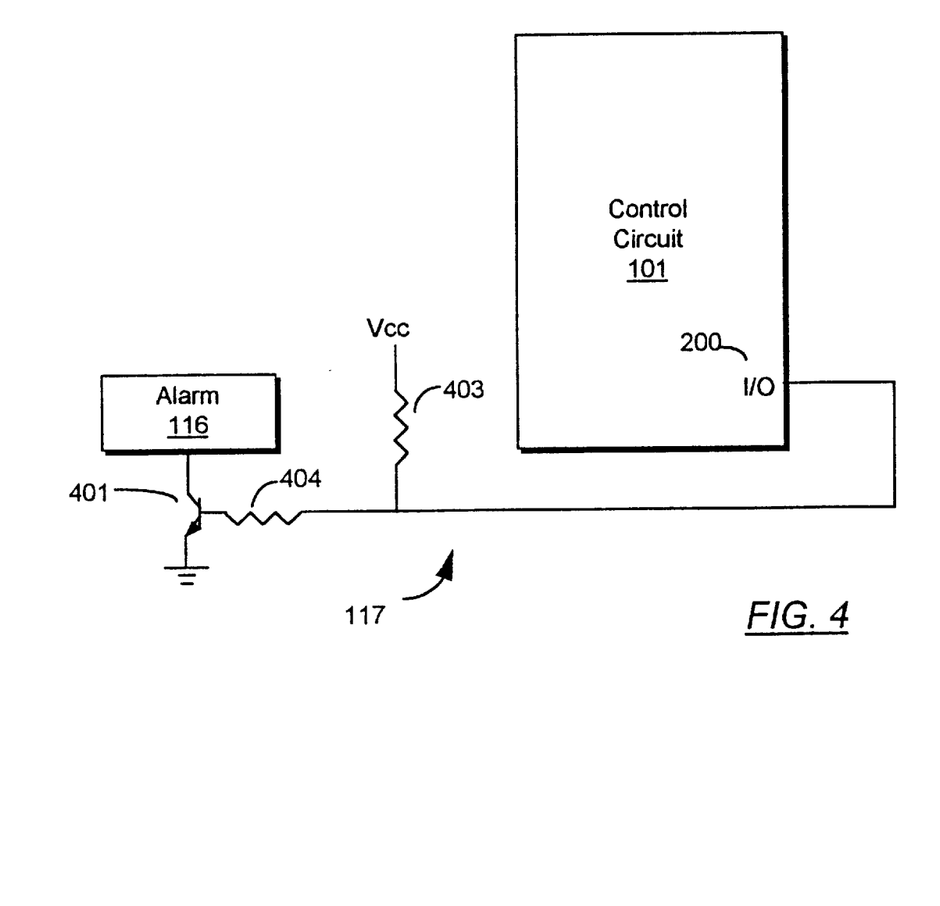
FIG. 4 illustrates a schematic of an exemplary microcontroller supervision circuit in accordance with the present invention.

FIG. 4 illustrates an example of supervision circuit 117 in accordance with the present invention. As set out herein before, I/O pin 200 is programmed to provide a high impedance upon occurrence of a reset condition. The program of control circuit 101 is such that I/O pin 200 remains in a high impedance condition until an instruction is executed to configure I/O pin 200 as an output pin having low impedance. I/O pin 200 is coupled through resistor 403 to the positive power supply Vcc. Resistor 403 is sized such that I/O pin 200 is driven to a logic high level when I/O pin 200 is in a high impedance condition. When I/O pin 200 is in a low impedance condition and hence coupled to a logic low resistor 403 is sized to limit current and thereby allow I/O pin 200 to maintain a logic low voltage with minimal current during a period. I/O pin 200 is also coupled through base resistor 402 to the base of transistor 401. Transistor 401 is illustrated as an NPN bipolar transistor, however other circuit configurations are known for using PNP bipolar transistors or MOS transistors or more complex amplifiers or comparitor circuits as substitutes for NPN transistor 401. NPN transistor 401 is merely the simplest and most straight forward means for implementing supervision circuit 117 in accordance with the present invention.

The collector of NPN transistor 401 is coupled to alarm 116 so as to cause current to flow through alarm 116 when transistor 401 is turned on. The emitter of transistor 401 is coupled to ground in the preferred embodiment.

Microcontroller supervision circuit 117 operates to turn on transistor 401 when I/O pin 200 is in a high impedance state. This, in turn, creates a signal on the collector of transistor 401 that in the preferred embodiment is coupled to alarm 116 to signal a visible or audible alarm to notify the user that control circuit 101 has failed to execute code. When control circuit 101 executes code properly, I/O pin 200 is programmed as an output quickly thus driving I/O pin 200 to a logic low and turning off transistor 401. A side benefit of supervision circuit 117 is that when control circuit 101 is powered up and initially reset, supervision circuit 117 will cause a brief signal or chirp if an audible alarm 116 is used. This chirp will ensure the user that control circuit 101 is indeed operational and executing code properly. If for any reason control circuit 101 fails to execute code, a watchdog circuit within control circuit 101 will cause a reset condition forcing I/O pin 200 into a high impedance state. Supervision circuit 117 detects this high impedance state by signaling a continuous alarm. Such a condition would be likely if resonator 104 (shown in FIG. 1) failed entirely or if power supply 102 or brown out circuit 103 failed. In the case that resonator 104 simply begins to operate slowly or provide inaccurate timing, control circuit 101 will likely reset at random or periodic intervals caused by time out of the internal watchdog timer. In this case, I/O circuit 200 will be randomly or periodically forced into a high impedance state causing alarm 116 to chirp to alert the user of a problem internal to control circuit 101.

One advantage of supervision circuit 117 is that is operates entirely independently of control circuit 101 to provide an independent assessment of the activity of control circuit 101. Also, it can be seen that supervision circuit 117 uses very straight forward and simple circuitry that is known to be highly reliable. This allows very complex control circuits to be used for control circuit 101 while satisfying the long term reliability and operability standards required by independent testing agencies such as Underwriters Laboratories.

4. Microcontroller Supervision Method.

Figure 5:
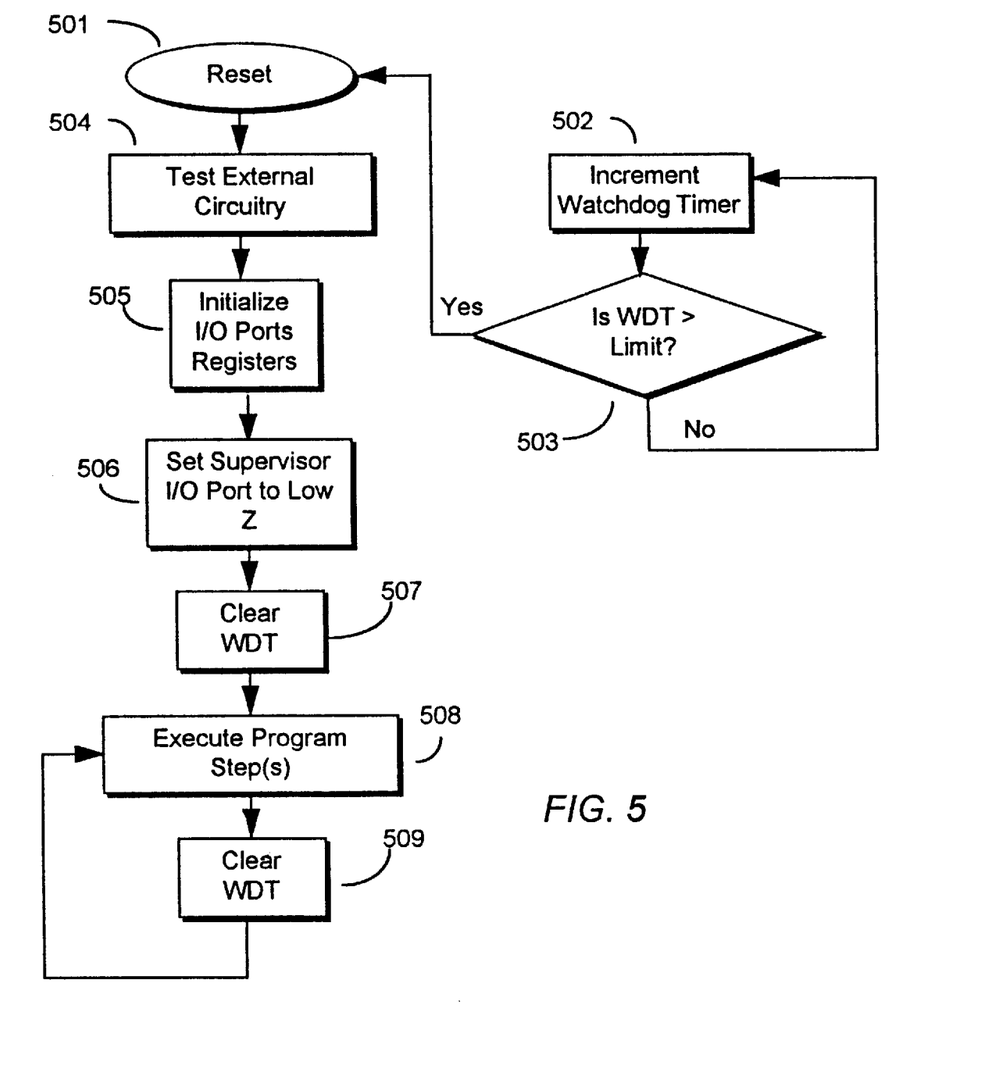
FIG. 5 shows a flow chart of the steps involved in a method of control circuit supervision in accordance with the present invention.

FIG. 5 illustrates a flow chart illustrating basic operations to implement control circuit supervision in accordance with the method of the present invention. Control circuit 101 initializes on power up or on occurrence of a watchdog timer time out in reset condition 501. A reset condition can also be caused by pulling the master clear input low. Control circuit 101 will stay in reset 501 as long as the master clear input is low or the oscillator is active.

During the reset condition 501 the state of control circuit 101 is defined as:

(1) All I/O port pins are put into a high impedance state;
(2) The program counter is set to all ones (1's);
(3) The watchdog timer is cleared; and
(4) The oscillator is running or will be started.

So long as resonator 104 (shown in FIG. 1) is operating control circuit 101 will begin to execute initialization code that is placed at the beginning of program memory.

The watchdog timer operates independently of the execution of code and will begin to increment in step 502. The watchdog timer circuit continuously increments and checks in step 503 to see if the watchdog timer value is greater than the predetermined limit. If the watchdog timer is below the limit the timer is incremented again in step 502. Steps 502 and 503 are repeated so long as control circuit 101 has power applied. If the watchdog timer limit is exceeded flow passes back to the reset condition 501.

When code is properly executed, external circuitry may optionally be tested as shown in step 504. In step 504, control circuit 101 issues data and/or instructions to external circuitry and awaits responses. The responses are tested against predefined appropriate responses to determine if the external circuitry is functioning. Failure of any external circuitry detected in step 504 can be handled by error handling subroutines within the program of control circuit 101. Inclusion of external circuitry test step 504 is optional in accordance with the present invention. In addition to testing external circuitry, step 504 can be used to verify the integrity of code stored in the program memory. This can be performed using well known check sum verification techniques. Also, internal circuitry can be tested by writing and reading data to and from random access memory in control circuit 101. These integrity tests performed during step 504 are all optional.

In step 505, the I/O ports are initialized and registers are initialized. In step 505 selected ones of the I/O ports are defined as inputs all others are defined as outputs. Initial values are loaded from program memory into registers. Like step 504, the initialization of the I/O ports and registers is optional and may be performed at a later stage during program execution.

In accordance with the present invention, in step 506 the supervisor I/O port (I/O port 200 in FIG. 2 and I/O port 300 in FIG. 3) are set to low impedance. As described herein before, step 506 results in turning off the alarm 116 shown in FIG. 1. Importantly, step 506 cannot be reached unless program code is executing and control circuit 101 has effectively left reset condition 501. By placing the initialization step 505 and the circuit integrity test step 504 before step 506, it is possible to verify circuit integrity and functionality before turning off the alarm. This will allow a user to judge functioning of the external circuitry from the length of time that the alarm is activated.

After the alarm is deactivated in step 506, the watchdog timer is cleared, if necessary, in step 507. The watchdog timer need only be cleared in time to avoid a time-out in step 503 and so step 507 may or may not be required immediately after step 506 depending on the amount of code preceding step 506.

Program flow continues by executing program steps and clearing the watchdog timer periodically in steps 508 and 509. Steps 508 and 509 are repeated continuously until some program interrupt occurs. An example of a program interrupt may be caused by detection of some failure during the execution of program steps, expiration of the watchdog timer, or manual reset of control circuit 101. Any errors during program execution step 508 or clear watchdog timer step 509 that result in the watchdog timer exceeding its limit will cause in a reset condition. If the error condition is removed by returning to reset condition 501, the result will be a momentary chirp by alarm 116 shown in FIG. 1. If the error condition is not corrected by the reset condition 501 the alarm signal will continue indefinitely or will periodically chirp as described hereinbefore.

It should be appreciated that an improved method and apparatus for supervision of a control circuit in a high reliability circuit has been provided. It is to be expressly understood that the claimed invention is not to be limited to the description of the preferred embodiment but encompasses other modifications and alterations within the scope and spirit of the inventive concept.

We claim:

1. A carbon monoxide monitor comprising:
   means for sensing carbon monoxide concentration and generating an electrical signal indicating the sensed carbon monoxide concentration;
   means for signaling having an input for receiving an electrical alarm signal;
   a programmable control circuit responsive to the means for sensing and coupled to the input of the means for signaling, wherein the control circuit is programmed to generate the electrical alarm signal based upon the electrical signal provided by the means for sensing, wherein the control circuit generates a high impedance condition on at least one input/output pin during a reset condition; and
   circuitry external to the control circuit and coupled to the at least one input/output pin for signaling a failure condition by detecting the high impedance condition and activating the means for signaling independent of the control circuit.

2. The carbon monoxide monitor of claim 1 wherein the failure condition is a failure of the control circuit to properly execute programmed instructions after the reset condition.

3. The carbon monoxide monitor of claim 1 wherein the means for detecting the high impedance connection further comprises:
   a pull-up resistor having a first end coupled to the at least one external pin and a second end coupled to a DC power supply voltage; and
   a voltage sense lead coupled to the first end of the resistor, wherein the potential of the voltage sense lead approaches the DC power supply voltage upon occurrence of the high impedance condition.

4. The carbon monoxide monitor of claim 3 wherein the alarm is coupled to the voltage sense lead so as to activate when the potential of the voltage sense lead approaches the DC power supply voltage.

5. The carbon monoxide monitor circuit of claim 1 wherein the alarm is an audible alarm that also serves as a signaling device for the carbon monoxide monitor to indicate excessive levels of carbon monoxide.

6. The circuit of claim 1 wherein said failure condition is a failure of the control circuit to execute code prior to, during or after said reset condition.

7. The circuit of claim 1 wherein a watchdog circuit causes said reset condition upon occurrence of said failure condition.

* * * * *